United States Patent [19]
Strohm et al.

[11] Patent Number: 5,149,430
[45] Date of Patent: Sep. 22, 1992

[54] FLUID DISTRIBUTING HEAD FOR A MEMBRANE FILTER MODULE FOR FILTRATION OF FLUIDS

[75] Inventors: Gerhard Strohm, Oestrich-Winkel; Wilfried Kaul, Weinsheim; Georg Schnieder, Traisen, all of Fed. Rep. of Germany

[73] Assignee: Seitz-Filter-Werke GmbH und Co., Bad Kreuznach, Fed. Rep. of Germany

[21] Appl. No.: 795,883

[22] Filed: Nov. 20, 1991

[30] Foreign Application Priority Data

Nov. 20, 1990 [DE] Fed. Rep. of Germany ....... 4036978
Nov. 6, 1991 [DE] Fed. Rep. of Germany ....... 4136551

[51] Int. Cl.$^5$ .............................................. B01D 63/02
[52] U.S. Cl. .......................... 210/321.8; 210/321.89; 210/500.23; 210/541
[58] Field of Search ........... 210/321.6, 321.72, 321.78, 210/321.79, 321.8, 321.87, 321.88, 321.89, 500.23, 541, 542

[56] References Cited

FOREIGN PATENT DOCUMENTS

3916511 12/1991 Fed. Rep. of Germany .

Primary Examiner—Frank Sever
Attorney, Agent, or Firm—Robert W. Becker & Associates

[57] ABSTRACT

With known fluid distributing heads a change of the fluid path for a given fixedly mounted membrane filter apparatus is only possible by using special adapters, respectively, insert parts due to the varying geometry of the flow channels of the fluid distributing heads for outer, respectively, inner flow paths. The suggested fluid distributing heads specific to inner or outer flow path facilitate the use of a filter module with fluid distributing heads within a membrane filter apparatus. The suggested fluid distributing heads for the inner and outer flow path provide, while maintaining the arrangement and diameter of the fluid channels of the fluid distributing head with respect to the arrangement of the intermediate channels for the inner and outer flow path, different embodiments whereby the first fluid channel connects to the face of the bundle end of the membranes and the second fluid channel connects with the outside of the capillary or hollow fiber membranes, or the first fluid channel connects with the outside of the capillary or hollow fiber membranes and the second fluid channel connects with the face of the bundle end of the membranes. These suggested fluid distributing heads are preferably used with membrane filter modules in fixedly mounted membrane filter apparatus for the filtration of fluids, especially of beverages, in a cross-flow process.

33 Claims, 5 Drawing Sheets

FLUID DISTRIBUTING HEAD FOR A MEMBRANE FILTER MODULE FOR FILTRATION OF FLUIDS

BACKGROUND OF THE INVENTION

The present invention relates to a fluid distributing head for a membrane filter module for micro and ultra filtration of fluids, whereby the membrane filter module comprises a filter housing and membranes in the form of a bundle disposed inside the filter housing. The membranes are selected from the group consisting of tubular membranes, capillary membranes, and hollow fiber membranes.

The filter housing, at a face thereof, has two separate inlets that are sealed relative to one another, with a first one of the separate inlets being a central inlet connected to a face of the bundle of membranes and with the second one of the separate inlets being an outer inlet connected with the outside of the bundle of membranes.

A fluid distributing head of the aforementioned kind is described in DE-OS 39 16 511. The disclosed membrane filter module which contains a bundle of capillary, respectively, hollow fiber membranes is characterized by an arrangement of all of the inlets of the capillary, respectively, hollow fiber membranes and of the interior of the housing at both end faces of the tubular housing The connection between the inlets is easily achieved by simply inserting both ends of the membrane filter module into a respective fluid distributing head. By selecting a respective fluid distributing head, an inner flow path or an outer flow path through the passages of the capillary respectively, hollow fiber membranes or along the outside of the capillary, respectively, hollow fiber membranes may be chosen as desired Since the arrangement of the filtrate and fluid flow channels in fluid distributing heads for the inner flow path, respectively, outer flow path differ, respective adjustments in a membrane filter apparauts, when changing the flow path, may only be achieved with exchangeable components such as fluid distributing plates.

Changing the flow path by exchanging the fluid distributing heads in a membrane filter apparatus with fixedly installed fluid distributing plates is thus complicated Furthermore, the relatively complicated design may also result in leakage problems.

Also, due to the design of the fluid distributing head known from DE-OS 39 16 511 further leakage problems may occur.

The sealing of the inlet of the faces of the tubular, capillary, respectively, hollow fiber membranes relative the inlet of the filter housing is achieved, in cooperation with the fluid distributing head, by an inner collar which protrudes axially relative to the face of the outer collar of the membrane filter module, whereby at least one annular sealing is provided at the outer mantle surface of the inner collar.

When the filter housing is made of stainless steel the use of such a sealing, due to the varying extension coefficients of the stainless steel housing, especially of the inner collar which receives the end of the membrane bundle, and of the ends of the bundle which are enclosed in an elastic sealing compound or fused with a plastic material, may result, already after the first use of the membrane filter module in ruptures within the sealing compound or plastic material and subsequently in loosening of its position at the inner collar. The membrane filter module may thus exhibit leakage and cannot be used properly.

This indicates that the sealing between the fluid distributing head, on the one hand, and the membrane filter module, on the other hand, must be improved upon.

It is therefore an object of the present invention to provide a fluid distributing head to be used with a membrane filter module with which the change between the flow paths is facilitated Furthermore, the sealing between the fluid distributing head and the membrane filter module must be improved.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The fluid distributing head of the present invention is primarily characterized by a housing with two parallel side walls and a face extending perpendicular to the parallel side walls, whereby the face has a receiving opening for receiving the face of the filter housing and the housing has a first and second fluid channel extending at a right angle relative to the receiving opening from a first one of the parallel side walls to a second one the parallel side walls, with the first and second fluid channels being separated from one another, whereby, when the filter housing is received by the receiving opening, the first and second fluid channels, respectively, are connected by intermediate channels to a respective one of the two separate inlets of the filter housing; and an arrangement of the intermediate channels that is varied depending on an inner and an outer flow path within the membrane filter module, whereby an arrangement and respective diameters of the first and second fluid channels remain unchanged.

Thus, the concept of the invention lies in the fact that while maintaining the arrangement and the diameters of the fluid channels the fluid distributing head is embodied in different designs with respect to the arrangement of the intermediate channels for the desired inner and outer flow paths within the filter module whereby the first fluid channel is connected to the face of the bundle and the second fluid channel is connected with the outside of the capillary or hollow fiber membranes, or the first fluid channel is connected with the outside of the capillary or hollow fiber membranes and the second fluid channel is connected with the face of the bundle. From this concept results the advantage that when a change in the flow path is desired within a membrane filter apparatus, intermediate plates or adapters are no longer required. The change of the flow path is achieved simply by exchanging the fluid distributing heads for the one flow path with a fluid distributing head for the other flow path.

In a preferred embodiment the first fluid channel is designed to be the channel for the unfiltered fluid and the second fluid channel is designed to be the channel for the filtrate whereby the first fluid channel has a greater diameter than the second fluid channel which is the filtrate channel. This ratio between the diameters of the fluid channels is especially advantageous for the flow and pressure conditions during a filtration process.

For all of the inventive embodiments of the fluid distributing head a receiving opening is provided into which the membrane filter modules are simply inserted with their end sections or, optionally, screwed in. The sealing action is achieved by an annular sealing element which rests at corresponding mantle surfaces of the fluid distributing head and of the membrane filter module. Due to this arrangement the membrane filter modules have a limited but sufficient play in order to be axially displaceable relative to the fluid distributing head so that they can compensate thermal and mechanical tensions occurring, for example, during the sterilization process.

In a first embodiment of the inventive fluid distributing head the receiving opening for the membrane filter module is provided with two chambers that correspond to the inlets of the filter housing of the membrane filter module whereby each chamber is connected via at least one intermediate channel to a respective fluid channel. The intermediate channels are usually vertically connecting channels, however, horizontally extending channels or ports or recesses may also be provided in order to provide the connection between the chambers and the respective fluid channel.

In a preferred embodiment the division of the receiving opening into the two chambers is achieved by an inner wall in the form of a collar which, in the assembled state of the filter housing and the fluid distributing head, optionally surrounds an axially protruding inner collar of the filter housing in a sealing manner.

With this first embodiment, in the first variant for the inner flow path, the first fluid channel for the unfiltered fluid having a greater diameter is connected with one of the two chambers, in this case, the first (central) chamber (enclosed by the collar) of the receiving opening, via an intermediate channel, and the second (filtrate) fluid channel with the smaller diameter is connected to the second chamber, i.e. the annular chamber surrounding the first (central) chamber, via at least a further intermediate channel. Contrary to the teaching of the prior art, according to which, for maintaining a stable arrangement, the second (filtrate) fluid channel with the smaller diameter must be provided with a common port that connects with the annular chamber, with the present invention it is possible to provide a design which, regarding the arrangement and dimensions of the fluid channels for the second variant (the outer flow path), is also compatible with the first embodiment of the fluid distributing head by simply moving the second (filtrate) fluid channel in an upward direction (towards the chambers) and by providing a connection between the second (filtrate) fluid channel and the annular chamber via one or more intermediate channels.

In the second variant for the outer flow path in the first embodiment of the inventive fluid distributing head, the first fluid channel for the unfiltered fluid is connected with the annular chamber via a vertical channel or port and the second (filtrate) fluid channel is connected with the central chamber via an intermediate channel.

A second inventive embodiment of the fluid distributing head is characterized by a receiving opening having only a single chamber that is connected with the fluid channels. This modified chamber is provided with an annular step having at its inner mantle surface a means for receiving at least one annular sealing element. This receiving means may be provided in the form of an annular recess or groove. A sealing element inserted therein may then effect a sealing action with the outer mantle surface of the end of the bundles of tubular, capillary, or hollow fiber membranes at the inlet of the face of the respective membrane bundle when the fluid distributing head is positioned on the membrane filter module.

In the first variant for the inner flow path according to the second embodiment it is preferred that the first fluid channel for the unfiltered fluid is connected to the chamber of the receiving opening via an intermediate channel and the second (filtrate) fluid channel is connected with the chamber of the receiving opening via at least one further intermediate channel that opens at the face of the annular step.

In the second variant for the outer flow path according to the second embodiment it is preferred that the first fluid channel for the unfiltered fluid is connected to the chamber of the receiving opening via at least one intermediate channel that opens at the face of the annular step and the second (filtrate) fluid channel is connected with the chamber via at least one further intermediate channel.

The annular stepped embodiment of the receiving opening according to the second embodiment of the present invention results in a more massive and thus more stable embodiment of the fluid distributing head. Since the annular chamber of the first embodiment has been eliminated in this second embodiment (thus the additional inner collar is also obsolete), the first fluid channel for the unfiltered fluid in the first variant for the inner flow path may be arranged closer to the receiving opening in the axial direction as compared to the known fluid distributing head for the inner flow path. When additionally the second (filtrate) fluid channel is moved farther away from the receiving opening, a fluid distributing head results in which the arrangement and the diameters of the fluid channels correspond to the arrangement and the diameters of the fluid channels of a fluid distributing head for an outer flow path. From this results the complete compatibility of all the variants of the embodiments of the inventive fluid distributing head with respect to the arrangement and the diameters of the fluid channels.

This ensures especially the combination of favorable flow characteristics on the one hands with a simple and facilitated manufacture of the fluid distributing head on the other hand.

It is furthermore preferred that the first fluid channel is adjacent to the upper end of the chamber respectively the central chamber or borders directly on the single chamber, respectively, the central chamber. With such an embodiment it is advantageous when the second fluid channel, in the axial direction, is positioned farther away from the chamber relative the first fluid channel. The connection of the second fluid channel to the single chamber, respectively, the central chamber or to the annular chamber is then achieved via at least one intermediate channel whereby the intermediate channel is essentially parallel to the axis of the housing and is essentially at a right angle relative to the second fluid channel.

It is preferred that in the case of a plurality of intermediate channels, with each intermediate channel having a substantially smaller diameter than the second fluid channel, for connecting to the second fluid channel an arrangement of the intermediate channels adjacent to one another on an imaginary circular arc within the fluid distributing head is provided, whereby the curvature corresponds to that of the outer inlet, respectively, the central inlet of the filter housing and, in the case of an annular step within the chamber, corresponds to the curvature of the face of the annular step.

The exterior of the fluid distributing heads is embodied such that they are provided with planar side walls whereby the first and second fluid channels extend from one side wall to the other. The openings of the fluid channels extending from one side wall to the other are preferably provided at one of the side walls of the fluid distributing head with an aseptic sealing while the other side wall is provided with a corresponding planar and smooth abutment surface. In this manner, a plurality of fluid distributing heads may be easily assembled adjacent to one another.

This is further facilitated and improved by providing a bore at each of the fluid distributing heads which extends parallel to the fluid channels and receives respective support rods. These bores may be used for fastening a plurality of fluid distributing heads adjacent to one another and for pressing these fluid distributing heads against one another.

Within the scope of the invention the fluid distributing heads may be manufactured of any suitable material. Such suitable materials may be metal, steel, stainless steel, ceramic, glass etc. Especially preferred are materials such as a suitable plastic or even mixtures of suitable plastics, for example, polyolefins. It should be noted especially that the chosen material must be inert towards the material to be filtered, so that no chemical interaction between the material of the fluid distributing head and the filtrate, respectively, the fluid to be filtered will occur.

Furthermore, it is advantageous that the stability of certain areas of the fluid distributing head is increased by reinforcements and embedding respective reinforcement rings or similar means which, for example, consist of stainless steel. This is especially expedient when, for example, a central chamber and an annular chamber are present in the fluid distributing head which requires a collar with a relatively thin cross-section. Thus, a reinforcement is required to compensate the special stresses and strains during a filtering process. The reinforcement elements or ribs are preferably embedded within the fluid distributing head so that they will not come into contact with the filtrate, respectively, the unfiltered fluid. They are thus entirely enclosed by the material of which the fluid distributing heads are made.

Essential for the flawless functioning of the fluid distributing heads in all of its variants and embodiments is the sealing action of the head in cooperation with the inserted membrane filter module. For this purpose there is at least one annular groove or recess, respectively, annular cutout provided for receiving a sealing element. This annular groove or recess is preferably provided at the inner mantle surface of the wall portion of the fluid distributing head in the vicinity of the end face of the receiving opening of the fluid distributing head. The sealing action may be achieved by a sealing element which is inserted into the respective recess and which interacts with a corresponding surface at the inserted membrane filter module to thereby effect the sealing action towards the outside. In principle, the sealing element may also be supported by the filter housing of the membrane filter module so that during the assembly of the filter housing and the fluid distributing head a sealing action is achieved although no annular groove, respectively, recess is provided at the fluid distributing head.

When an annular stepped chamber is provided within the fluid distributing head the desired separation of the central inlets of the face of the end of the bundle, respectively the outer inlets to the outside of the capillary, respectively, hollow fiber membranes requires that at least one further sealing element be provided.

In this case it is preferred that the receiving opening within the fluid distributing head will support the sealing elements for sealing the outer collar of the filter housing as well as the sealing elements for sealing the central inlet to the capillary, respectively, hollow fiber membrane at the face of the bundle. In the case of an annular chamber the filter housing may support the sealing elements (especially the inner collar, if present, is suitable) so that the fluid distributing heads according to the second embodiment may also be used with membrane filter modules designed to match the first embodiment of the fluid distributing heads.

However, when the arrangement of the sealing elements is provided at the fluid distributing head, it is preferable that at least one receiving means, respectively, annular recess is arranged within the inner section of the collar-like outer wall of the fluid distributing heads which delimits the outer circumference of the annular chamber for receiving the ends of the bundle of capillary, respectively, hollow fiber membranes.

The sealing elements used for the sealing action are preferably made of a material which is inert towards the fluids to be filtered and the filtrate, for example, a suitable plastic such as especially polyolifin may be used. Expediently, the sealing elements are in the form of O-rings which are insertable into recesses at the inner mantle surfaces of the receiving opening.

DESCRIPTION OF PREFERRED EMBODIMENTS

The present invention will now be described in detail with the aid of several specific embodiments utilizing FIGS. 1 through 13.

Figure 12:
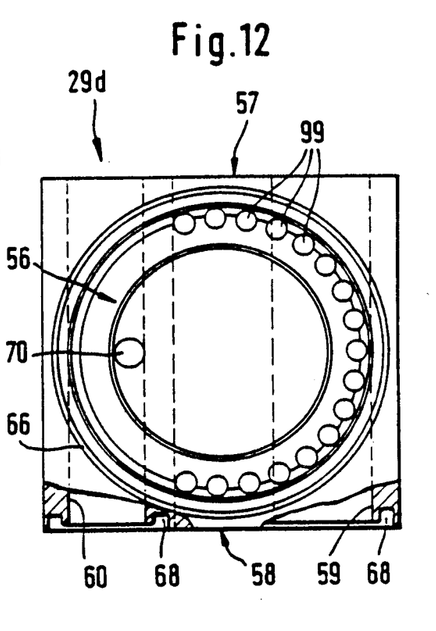
FIG. 12 shows a part-sectional plan view in the direction of arrow 12 of the fluid distributing head according to FIG. 10.
Figures 13, 14:
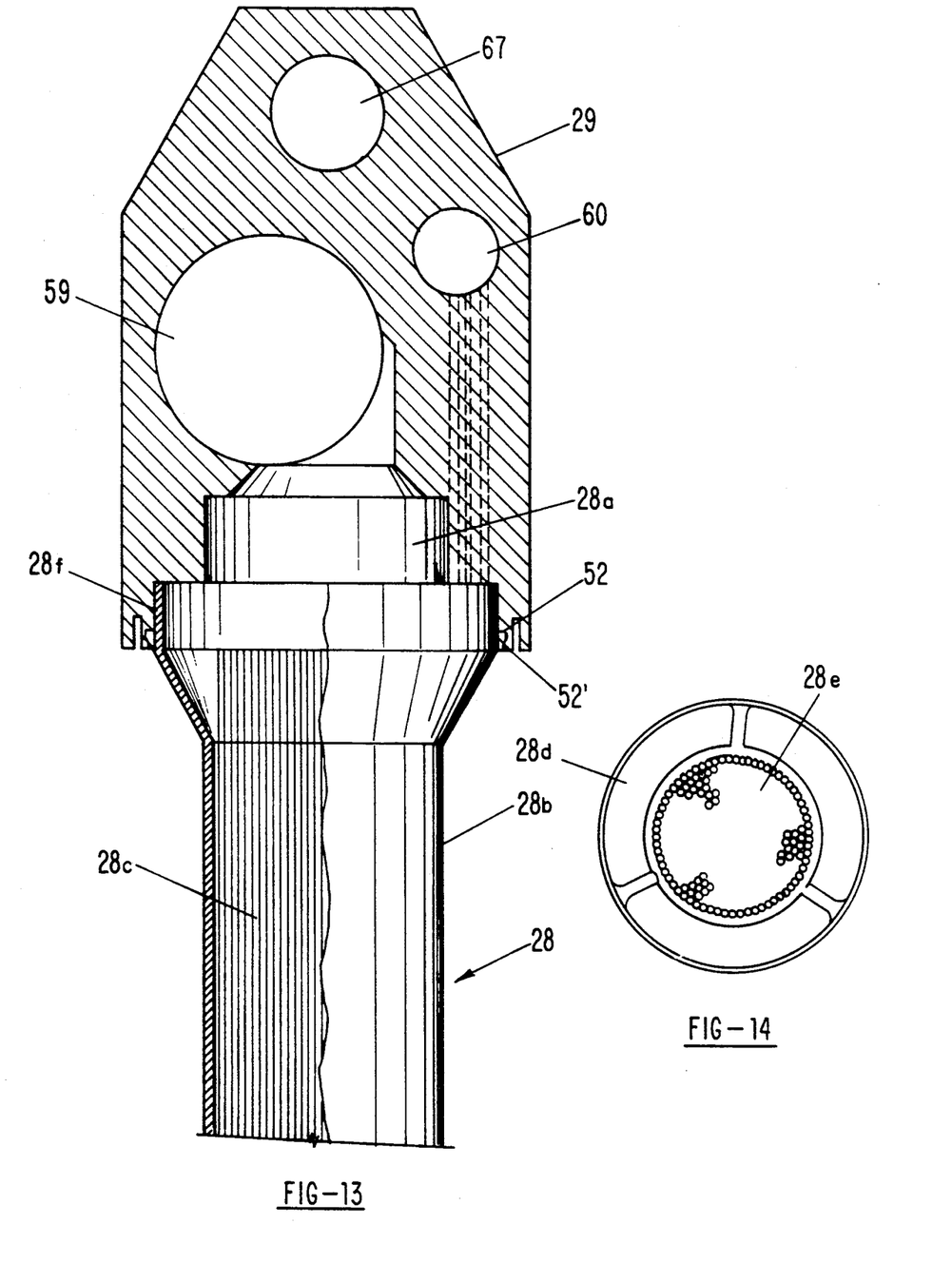
FIG. 13 is a schematic representation of a fluid distributing head with an engaged membrane filter module.
FIG. 14 shows a cross-sectional view of the end section of the filter module of FIG. 13.

FIGS. 1 through 6 represent a first embodiment of the fluid distributing head 29a, 29b for the use with a membrane filter module 28 (see FIG. 13). The variants shown in the FIGS. 1 through 6 differ from those shown in the FIGS. 7 through 12 of a further (second) inventive embodiment of the fluid distributing heads 29c, 29d by the design of the receiving opening 56 The receiving opening 56 in the FIGS. 1 through 6 is comprised of two chambers, namely a first central chamber 62 and a second annular chamber 63 while the variant shown in FIGS. 7 to 12 has a receiving opening 56 comprised of a single chamber 85 with an annular step 86. Depending on the embodiment of the fluid distributing head, a membrane filter module 28 with a corresponding embodiment of the filter housing 28b respectively of the membrane bundle 28c with respective ends 28a received in the filter housing must be used. FIG. 13 shows a general assembly of a filter module 28 that is inserted into an inventive fluid distributing head 29.

When it is desired to guide the circulating flow of the fluid to be treated through the inner passage of the capillary or hollow fiber membranes (channel 28e; FIG. 14) then fluid distributing head 29a in the embodiment according to FIGS. 1 through 3 or fluid distributing head 29c in the embodiment according to FIGS. 7 to 9 must be used. However, when it is desired to guide the circulating flow of the fluid to be treated along the outside of the capillary or hollow fiber membranes through channel 28d, respectively, outer inlet (FIG. 14) then the fluid distributing head 29b according to FIGS. 4 to 6 or fluid distributing head 29d according to FIGS. 10 to 12 must be used.

The fluid distributing heads 29a to 29d are provided with a housing having two parallel side walls 57 and 58 between which and at a right angle to the receiving opening 56 the fluid channels 59 and 60 extend. At the end of the fluid distributing head which is opposite the receiving opening 56 the heads are provided with a bore 67 that extends between the side walls 57 and 58. With this bore 67 the fluid distributing heads 29a to 29d may be assembled on support rods which are not represented in the drawings On one of the side walls 58 the fluid channels 59 and 60 are surrounded by aseptic sealing rings 68 which abut against the planar side wall 57 of a neighboring fluid distributing head 29a to 29d.

The receiving opening 56 in the embodiment according to 29a and 29b is divided into two chambers by a collar 61 whereby these chambers correspond to the inlets of the filter housing 28b provided at the face thereof. The two chambers are a first central chamber 62 and a second annular chamber 63. The inner collar 61 which divides the receiving opening into the first central chamber 62 and the annular chamber 63 is embodied such that a corresponding inner collar of the filter housing is received therein whereby a sealing element which is positioned at the inner collar of the filter housing cooperates with the inner surface of the collar 61.

As can be seen from the FIGS. 7 to 12 the fluid distributing heads 29c and 29d according to the second embodiment of the invention have a receiving opening 56 in the form of a single chamber 85, i.e., a collar 61 is no longer needed. Instead the chamber 85 is provided with an annular step 86 and a radially inwardly facing mantle surface 88 for receiving the end 28a of the bundle of tubular, capillary, or hollow fiber membranes. In contrast to the embodiment represented in the FIGS. 1 and 4 this second fluid distributing head is provided with a receiving means or groove 89 for the sealing element within the inner mantle surface 88, whereby this sealing element is for example an O-ring which in connection with the end 28a of the bundle of the tubular, capillary, or hollow fiber membrane effects the sealing action of the inlet to these membranes.

It is common to all of the four variants 29a to 29d that the annular chamber 63 respectively the single chamber 85 are delimited by the wall portion 64 of the housing of the fluid distributing head which is provided with a receiving means or recess for a sealing element whereby, for example, an annular recess may be provided. An annular sealing element 52' which is inserted into these recesses 52 engages the outer mantle surface of an outer collar 28f provided at the filter housing of the inserted membrane filter module and thus seals the connection of the filter housing and the fluid distributing head.

Since the fluid distributing heads 29a to 29d in the example of the FIGS. 1 to 12 are comprised of plastic, preferably polyolefin, the edge of the receiving opening 56, respectively, the respective wall portion 64 is reinforced in all four variants and in the embodiments according to FIGS. 1 to 6 the inner collars 61 are also reinforced by an embedded metal ring, for example, stainless steel rings 65, 66.

Figure 1:
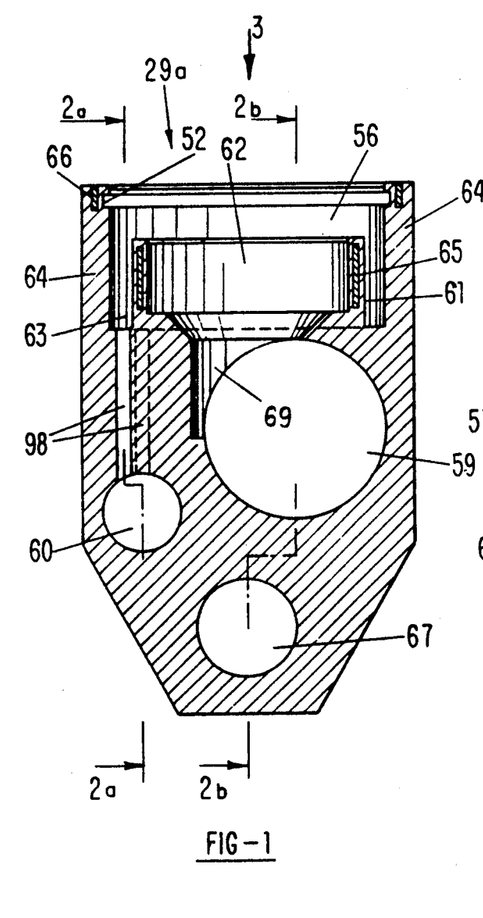
FIG. 1 shows a first embodiment of a fluid distributing head to be positioned on a membrane filter module for an inner flow path of the membranes in a cross-sectional view along the lines 1—1 of FIG. 2.
Figures 2, 3:
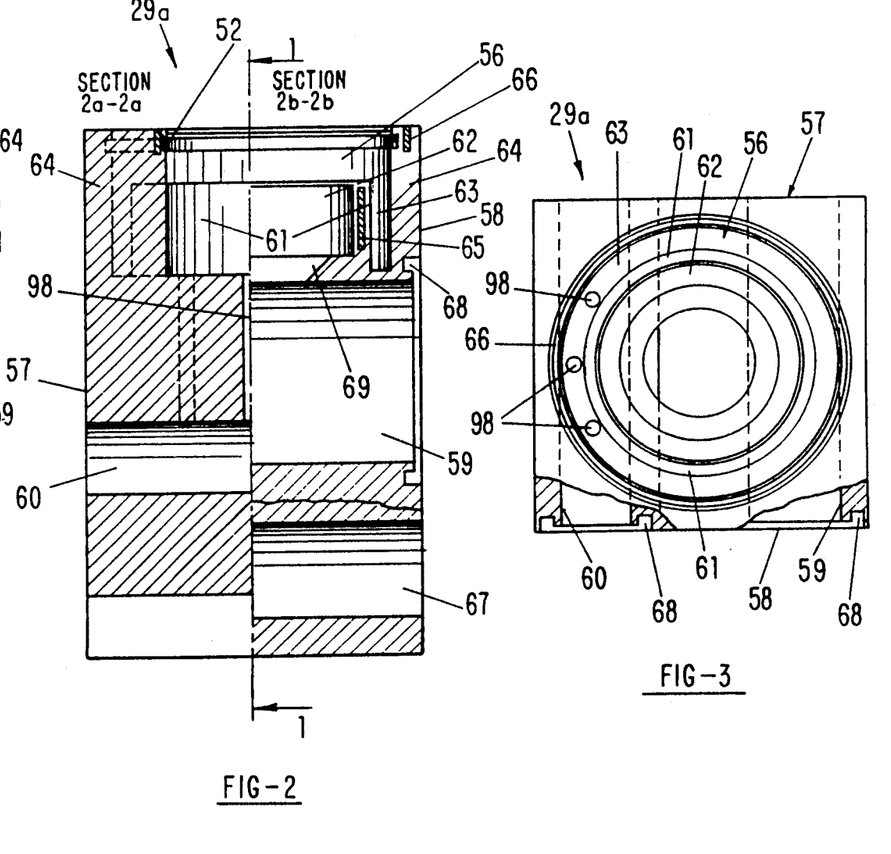
FIG. 2 shows the fluid distributing head according to FIG. 1 in a cross-sectional view along the lines 2a—2a and 2b—2b of FIG. 1.
FIG. 3 shows a part-sectional plan view in the direction of arrow 3 of the fluid distributing head according to FIG. 1.

The variant according to FIGS. 1 to 3 is designed for the inner flow path (via channel 28e, respectively, central inlet, see FIG. 14) and the first fluid channel 59 which has the greater diameter and is designed for guiding the circulated fluid to be treated is connected via an intermediate channel 69 to the first central chamber 62 while the second fluid channel 60, which is designed to remove the filtrate and has a smaller diameter, is connected to the annular chamber 63 via three intermediate channels 98. As can be seen from FIG. 3, intermediate channels are arranged on a circular arc which corresponds essentially to the outer inlet or channel 28d of the membrane filter module that is inserted into the receiving opening.

Figure 4:
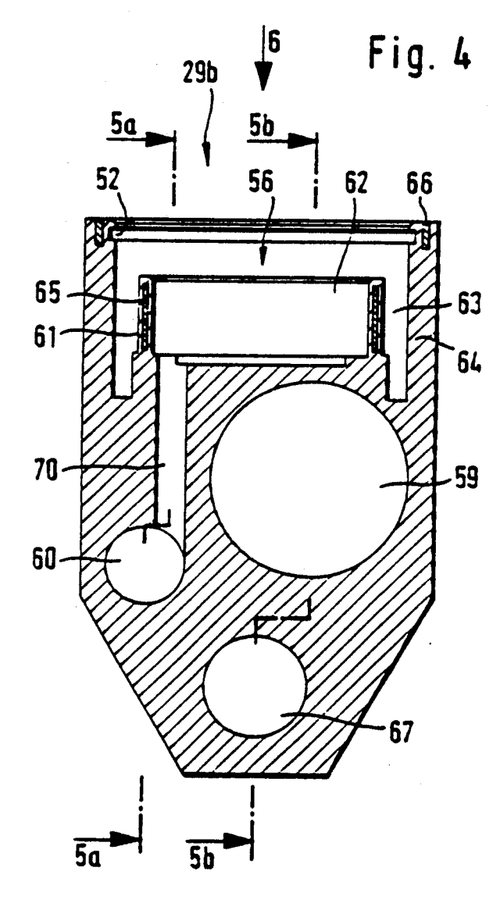
FIG. 4 shows the first embodiment of a fluid distributing head to be connected to a membrane filter module for an outer flow path of the membranes in a cross-sectional view along the lines 4—4 of FIG. 5.
Figure 5:
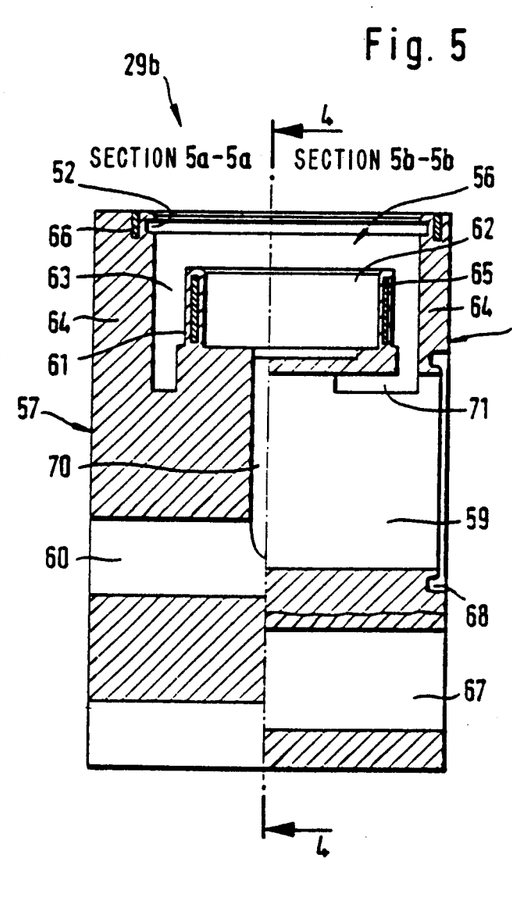
FIG. 5 shows the fluid distributing head according to FIG. 4 in a cross-sectional view along the lines 5a—5a and 5b—5b of FIG. 4.
Figure 6:
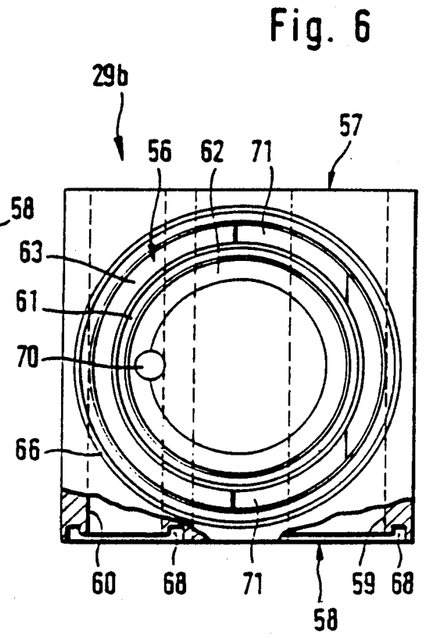
FIG. 6 shows a part-sectional plan view in the direction of arrow 6 of the fluid distributing head according to FIG. 4.
Figure 7:
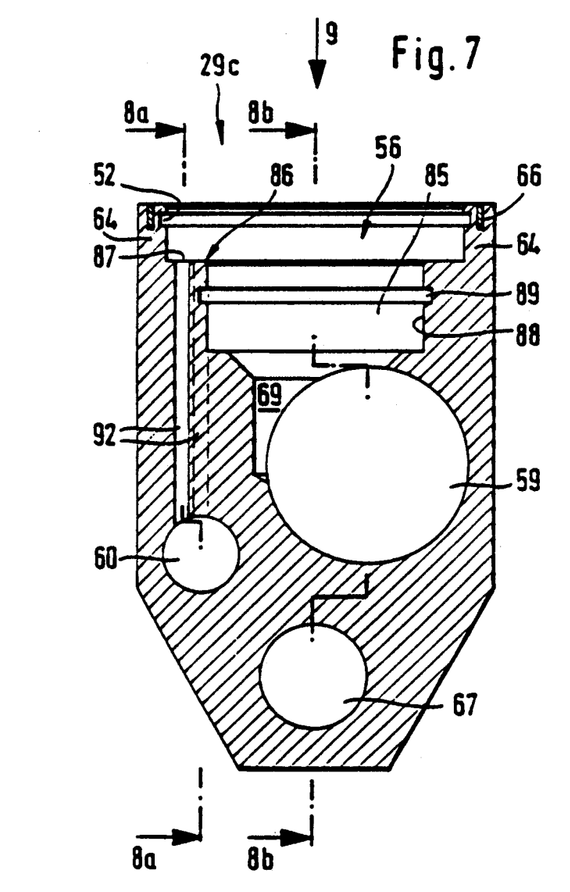
FIG. 7 shows a second embodiment of a fluid distributing head to be connected to a membrane filter module for an inner flow path of the membranes in a cross-sectional view along the line 7—7 in FIG. 8.
Figure 8:
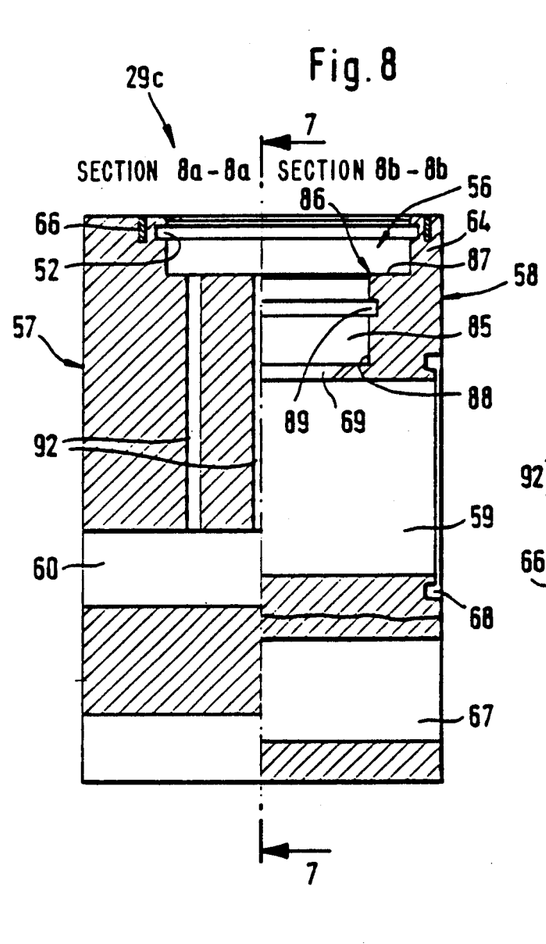
FIG. 8 shows the fluid distributing head according to FIG. 7 in cross-sectional views along the lines 8a—8a and 8b—8b in FIG. 7.

In contrast to this variant the fluid distributing head 29b for an outer flow path (via channel or outer inlet 28d) corresponding to the first embodiment of the invention, as can be seen in the FIGS. 4 to 6, the central chambers 62 is connected via an intermediate channel 70 to the fluid channel 60 having the smaller diameter while the annular chamber 63 is connected via a port 71 with the fluid channel 59 having a greater diameter.

When comparing the two variants for the inner and outer flow path (29a and 29b) it is obvious that the diameter of the first and second fluid channels 59, 60 as well as their position and arrangement relative to the receiving opening are identical.

Figure 9:
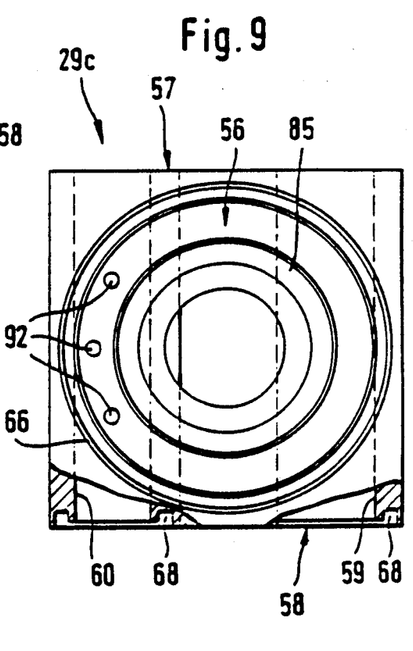
FIG. 9 shows a part-sectional plan view in the direction of arrow 9 of the fluid distributing head according to FIG. 7.

In the variant for the inner flow path (via channel or central inlet 28e) according to the second embodiment of the inventive fluid distributing head 29c (FIGS. 7 to 9), the fluid channel 59 with the greater diameter is connected via an intermediate channel 60 to the chamber 85. The fluid channel 60 having the smaller diameter, as can be seen in FIG. 9, is connected via three intermediate channels 92 to the chamber 85 whereby the intermediate channels 92 open at the face 87 of the annular step 86 of the chamber 85.

Figure 10:
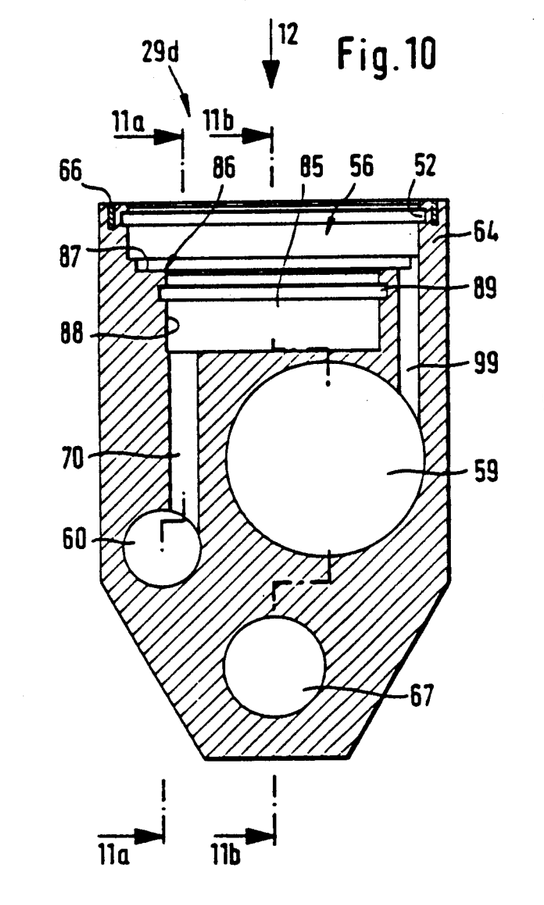
FIG. 10 shows the second embodiment of a fluid distributing head to be connected to a membrane filter module for the outer flow path of the membranes in a cross-sectional view along the line 10—10 in FIG. 11.
Figure 11:
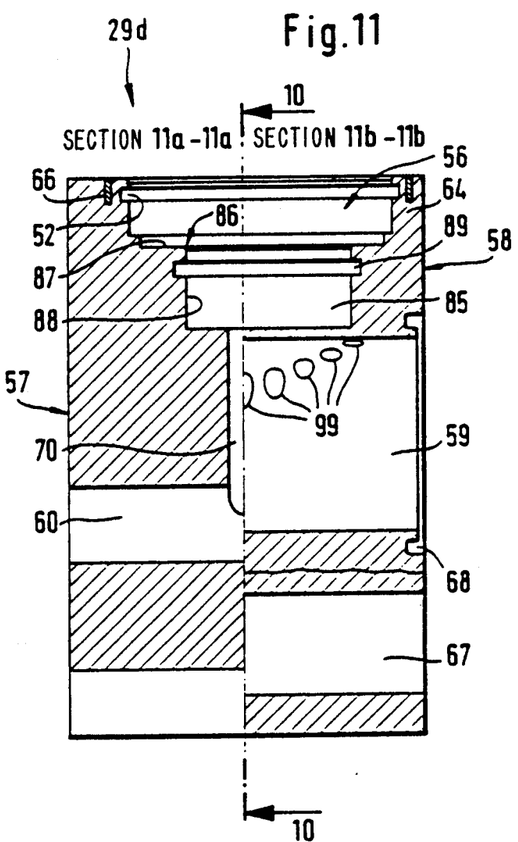
FIG. 11 shows the fluid distributing head of FIG. 10 in a cross-sectional view along the lines 11a—11a and 11b—11b in FIG. 10.

In the variant for the outer flow path (via channel or outer inlet 28d) of the second embodiment of the inventive fluid distributing head 29d according to the FIGS. 10 to 12 the fluid channel 60 with the smaller diameter is connected via an intermediate channel 70 to the chamber 85 (instead of being connected according to the first embodiment to the central chamber 2). The fluid channel 59 with the greater diameter, however, is connected via a plurality of intermediate channels 99 which open at the face 87 of the annular step 86 of the chamber 85 (instead of being connected according to the first embodiment via a port to the annular chamber 63). The greater number of intermediate channels 99 results from the relatively great diameter of the fluid channel 59 and serves advantageously to maintain an uninterrupted flow. As can be seen best in FIG. 12 the intermediate channels 99 are preferably arranged on a circular arc which corresponds to the face 87 of the annular step 86.

When comparing the two variants 29c and 29d of the second embodiment with the variants 29a and 29b of the first embodiment it is obvious that between the variants for the inner and outer flow paths as well as between the first and the second embodiment of the inventive fluid distributing heads an absolute conformity with respect to the diameter and the arrangement of the first and second fluid channels is ensured. This allows advantageously the elimination of the required adaptation of fluid distributing plates within membrane filter apparatus for a respective application of selected fluid distributing heads specific to the inner and outer flow path. There is especially no further need for exchangeable insert parts for adapting the fluid distributing heads to the respectively chosen flow path. Thus, the change from one to the other operational mode may simply be achieved by exchanging the fluid distributing heads.

Further advantages and embodiments of the inventive fluid distributing heads may be taken from the following claims.

The present invention is, of course, in no way restricted to the specific disclosure of the specification and drawings, but also encompasses any modifications within the scope of the appended claims.

What we claim is:

1. A fluid distributing head for a membrane filter module for micro and ultra filtration of fluids, the membrane filter module comprising a filter housing and membranes in the form of a bundle disposed inside the filter housing, the membranes being selected from the group consisting of tubular membranes, capillary membranes, and hollow fiber membranes, the filter housing, at a face thereof, having two separate inlets that are sealed relative to one another, with a first one of the separate inlets being a central inlet connected to a face of the bundle of membranes and with the second one of the separate inlets being an outer inlet connected with an outside of the bundle of membranes, said fluid distributing head comprising means for providing an alternative for changing flow paths, including:

a housing with two parallel side walls and a face extending perpendicular to said parallel side walls, said face having a receiving opening for receiving the face of the filter housing, and said housing having a first and a second fluid channel extending at a right angle relative to said receiving opening from a first one of said parallel side walls to a second one of said parallel side walls, said first and second fluid channels being separated from one another, whereby, when the filter housing is received by said receiving opening, said first and said second fluid channels, respectively, are connected by intermediate channels to a respective one of the two separate inlets of the filter housing; and an arrangement of said intermediate channels that is varied depending on an inner and an outer flow path within the membrane filter module, with an arrangement and respective diameters of said first and second fluid channels remaining unchanged.

2. A fluid distributing head according to claim 1, wherein said first fluid channel is connected to the first central inlet and said second fluid channel is connected to the second outer inlet.

3. A fluid distributing head according to claim 1, wherein said first fluid channel is connected to the second outer inlet and said second fluid channel is connected to the first central inlet.

4. A fluid distributing head according to claim 1, wherein said first fluid channel is used for fluids to be filtered and said second fluid channel is used for resulting filtrates, and wherein said first fluid channel has a greater diameter than said second fluid channel.

5. A fluid distributing head according to claim 4, wherein said receiving opening has two chambers corresponding to said first inner and said second outer inlets, said chambers being connected by at least one of said intermediate channels to one of said fluid channels, respectively.

6. A fluid distributing head according to claim 5, wherein said two chambers are separated from one another by a collar.

7. A fluid distributing head according to claim 6, wherein said collar is annular and a first one of said chambers is a central chamber in a center portion of said receiving opening and a second one of said chambers is an annular chamber surrounding said first chamber.

8. A fluid distributing head according to claim 7, wherein, for said inner flow path, said first fluid channel is connected to said first chamber and said second fluid channel is connected to said annular chamber 9. A fluid distributing head according to claim 7, wherein, for said outer flow path, said first fluid channel is connected to said annular chamber and said second fluid channel is connected to said first chamber, whereby said intermediate channel connecting said first fluid channel to said annular chamber is in the form of a port.

10. A fluid distributing head according to claim 6, wherein said collar is provided with a reinforcement element made from metal.

11. A fluid distributing head according to claim 10, wherein said reinforcement element is made from stainless steel.

12. A fluid distributing head according to claim 10, wherein said reinforcement element is provided in such a manner as to avoid contact with the fluids.

13. A fluid distributing head according to claim 6, wherein a wall portion of said housing, said wall portion delimiting said receiving opening, and said collar are provided with reinforcement elements made from metal.

14. A fluid distributing head according to claim 13, wherein said reinforcement elements are made from stainless steel.

15. A fluid distributing head according to claim 13, wherein said reinforcement elements are provided in such a manner as to avoid contact with the fluids.

16. A fluid distributor head according to claim 5, wherein said first fluid channel is adjacent to said two chambers.

17. A fluid distributing head according to claim 5, wherein said second fluid channel in an axial direction of said fluid distributing head is positioned after said first fluid channel when viewed from said to chambers.

18. A fluid distributing head according to claim 5, wherein a radially inwardly oriented mantle surface of said housing which delimits said annular chamber has at least one recess for receiving an annular sealing element.

19. A fluid distributing head according to claim 4, wherein said receiving opening has a chamber with an annular step having an annular face, said chamber being connected to said fluid channels.

20. A fluid distributing head according to claim 19, wherein said annular step has a radially inwardly oriented mantle surface having a groove for receiving an annular sealing element.

21. A fluid distributing head according to claim 19, wherein, for said inner flow path, said first fluid channel is connected to said chamber by at least one of said intermediate channels and said second fluid channel is connected to said chamber by at least a further one of said intermediate channels which opens at said annular face.

22. A fluid distributing head according to claim 19, wherein, for said outer flow path, said first fluid channel is connected to said chamber by at least one of said intermediate channels which opens at said annular face and said second fluid channel is connected to said chamber by at least a further one of said intermediate channels 23. A fluid distributing head according to claim 19, wherein said first fluid channel is adjacent to said chamber.

24. A fluid distributing head according to claim 19, wherein said second fluid channel in an axial direction of said fluid distributing head is positioned after said first fluid channel when viewed from said to chambers.

25. A fluid distributing head according to claim 19, wherein a radially inwardly oriented mantle surface of said housing which is delimiting said annular chamber has at least one recess for receiving an annular sealing element.

26. A fluid distributing head according to claim 1, wherein a bore is provided within said housing for connecting a plurality of said fluid distributing heads in series on a support rod, said bore extending parallel to said first and second fluid channels.

27. A fluid distributing head according to claim 1, wherein said fluid distributing head is made of stainless steel.

28. A fluid distributing head according to claim 1, wherein said fluid distributing head is made of plastic material that is inert towards the fluids to be filtered.

29. A fluid distributing head according to claim 28, wherein said plastic material is a polyolefin.

30. A fluid distributing head according to claim 1, wherein openings of said fluid channels in said parallel side walls are provided with aseptic sealings such that said aseptic sealings are provided at a first one of said parallel side walls and that a second one of said parallel side walls is provided with a corresponding planar abutment surface.

31. A fluid distributing head according to claim 1, wherein a wall portion of said housing, said wall portion delimiting said receiving opening, is provided with a reinforcement element made from metal.

32. A fluid distributing head according to claim 31, wherein said reinforcement element is made from stainless steel.

33. A fluid distributing head according to claim 31, wherein said reinforcement element is provided in such a manner as to avoid contact with the fluids.

* * * * *